UNITED STATES PATENT OFFICE.

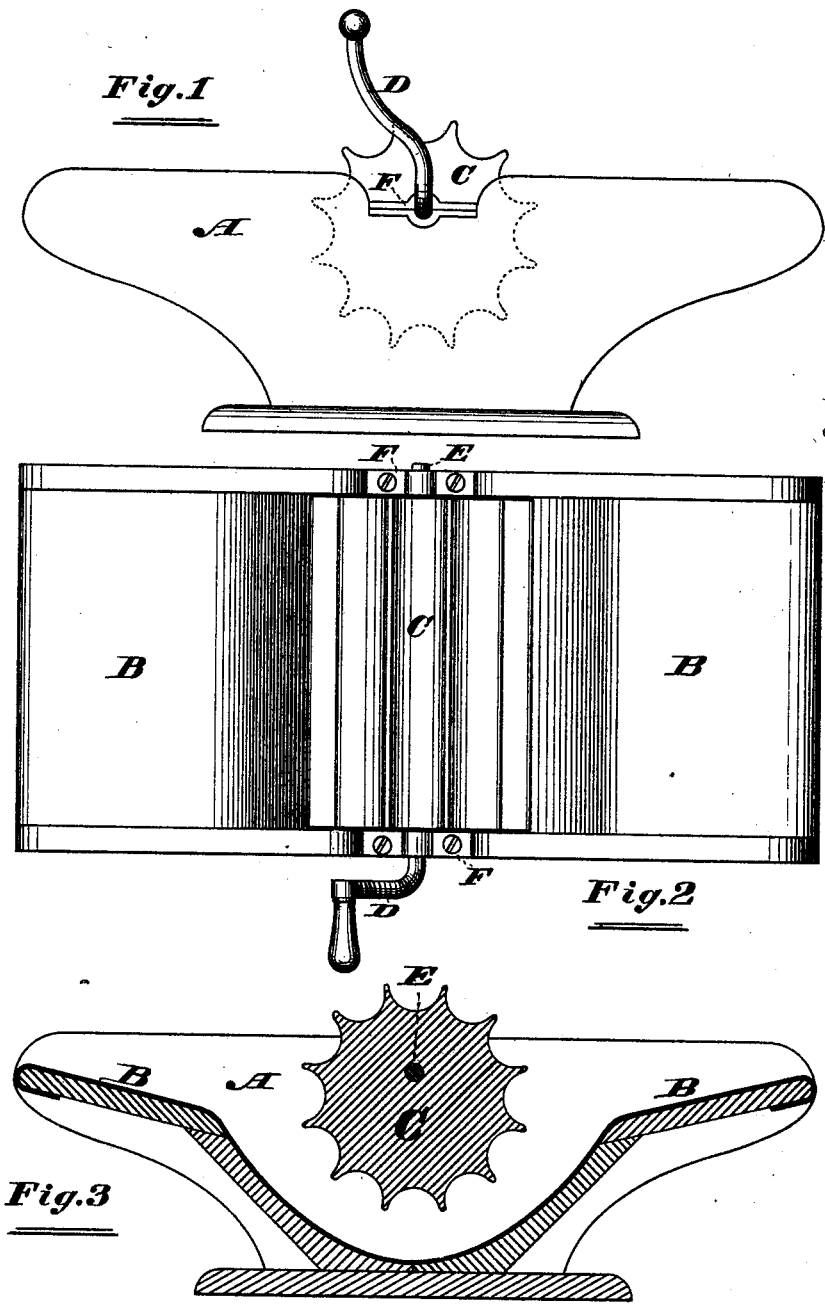

SAMUEL H. WHITTLESEY, OF IRVING PARK, ILLINOIS.

IMPROVEMENT IN DOUGH-KNEADING MACHINES.

Specification forming part of Letters Patent No. 219,838, dated September 23, 1879; application filed March 21, 1878.

*To all whom it may concern:*

Be it known that I, SAMUEL H. WHITTLESEY, of Irving Park, in the county of Cook and State of Illinois, have invented certain new and useful Improvements in Dough-Kneading Machines, of which I hereby declare the following to be a full, clear, and exact description, which will enable others skilled in the art to which my invention appertains to construct and use the same, reference being had to the accompanying drawings, forming a part of this specification, in which—

Figure 1 is a side elevation; Fig. 2, a view looking from above; and Fig. 3, a longitudinal central section.

My invention relates to a machine for kneading dough, and the object thereof is to imitate, so far as possible, the operation of kneading by hand.

The invention consists in the combination of specific devices, constructed and arranged to operate in a special manner, all of which will be hereinafter more fully explained, and definitely pointed out in the claim.

In the drawings, A represents the body or tray, intended as the receptacle for the dough during the operation of kneading the same. B represents the inclined platform, attached to the sides of the body A, upon which is deposited the dough by the action of the fluted cylinder C in its backward and forward movement during the operation of kneading.

The axial perforation in the cylinder C for the bearing is at a point above the center thereof, as in operation it is not intended to impart to the cylinder a rotary movement, but an oscillating one, which is found by practical experience to be much more effective in kneading dough, and six to ten minutes' kneading with this machine is equal to forty minutes' hand labor.

D represents the crank or handle attached to the axle E, said axle passing longitudinally through the cylinder C and resting in the bearings F.

The tray A is provided on the inside thereof with a lining of sheet metal, and is easily kept in a clean and sweet condition.

The operation of my kneading-machine is as follows: The material, being prepared for kneading in the usual manner, is then placed on either of the inclined planes and against the cylinder C, when, by a backward-and-forward motion of the crank and cylinder, the dough is worked from side to side, passing through the concavity underneath the cylinder, and alternately raised and deposited upon the inclined planes, this operation being continued until the dough is thoroughly kneaded and permeated by the atmosphere.

In this operation the mass of dough is not drawn out into a sheet, but is worked in a peculiar manner, the ribs on the cylinder making repeated depressions in the mass, which are successively closed up, thereby inclosing a certain quantity of air with each fold and thoroughly working it into and throughout the mass of dough.

It will also be noticed that the length of the kneading-cylinder is about the same as the width of the trough, so that none of the dough is crowded out or escapes at the ends of the cylinder. At the same time the shape of the trough is such (its ends being somewhat flaring) that the dough will be left in such a position by the cylinder as the eccentric portion thereof rises out of the trough that the mass will be caught and carried back by the said cylinder on its backward or return oscillation, thereby rendering its action automatic and obviating the necessity of touching the dough with the hands.

I am aware of the patents granted to G. R. Baker, October 10, 1865, J. C. Cleveland, January 16, 1866, and W. P. Jones, May 23, 1876. I do not claim any of the devices shown in said patents, either separately or when combined and arranged to operate as described in either of the patents, for in no one of them are the special devices claimed by me combined in such a manner as to operate in the way herein described, so as to obtain the peculiar action upon the mass of dough which I have above set forth.

Having thus described my invention, what I claim as new, and desire to secure by Letters Patent, is—

The central concave trough or receptacle, A, provided with inclined side tables, B, in combination with a fluted kneading-cylinder, C, mounted in a fixed eccentric position on its shaft E, and arranged centrally in and along the entire length of the trough, in which it is oscillated back and forth, substantially as and for the purpose set forth.

SAMUEL H. WHITTLESEY.

Witnesses:
  L. B. COUPLAND,
  A. DUNNING.